United States Patent
Vaswani et al.

(10) Patent No.: US 9,689,710 B2
(45) Date of Patent: Jun. 27, 2017

(54) POWER OUTAGE NOTIFICATION AND DETERMINATION

(71) Applicant: Silver Spring Networks, Inc., Redwood City, CA (US)

(72) Inventors: Raj Vaswani, Portola Valley, CA (US); Jana van Greunen, Redwood City, CA (US); William San Filippo, III, Los Altos Hills, CA (US); Sterling Hughes, San Francisco, CA (US); George Flammer, III, Cupertino, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 605 days.

(21) Appl. No.: 13/624,205

(22) Filed: Sep. 21, 2012

(65) Prior Publication Data
US 2014/0085105 A1 Mar. 27, 2014

(51) Int. Cl.
*G08C 19/04* (2006.01)
*G01D 4/02* (2006.01)

(52) U.S. Cl.
CPC ............ *G01D 4/02* (2013.01); *Y04S 20/36* (2013.01)

(58) Field of Classification Search
CPC .... G01D 4/02; G01D 4/004; G01R 19/16547; G01R 21/133; G01R 22/066;
(Continued)

(56) References Cited

U.S. PATENT DOCUMENTS

| | | |
|---|---|---|
| 5,541,589 A | 7/1996 | Delaney |
| 8,059,011 B2 | 11/2011 | Van Wyk et al. |

(Continued)

FOREIGN PATENT DOCUMENTS

| | | |
|---|---|---|
| EP | 2197229 A2 | 6/2010 |
| WO | 95/09473 A2 | 4/1995 |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Dec. 16, 2013, by the International Bureau of WIPO in corresponding International Application No. PCT/US2013/059151 (16 pages).

(Continued)

*Primary Examiner* — Steven Lim
*Assistant Examiner* — Mancil Littlejohn, Jr.
(74) *Attorney, Agent, or Firm* — Buchanan Ingersoll & Rooney PC

(57) ABSTRACT

Systems and methods for identifying and targeting power outages are provided. Electric meters of a system receive electric power from power distribution equipment in a power distribution network and information that identifies the respective power distribution equipment from which the meters receive electric power. Communication nodes are associated with electric meters and receive, from neighboring communication nodes, information identifying each respective neighboring communication node and the information identifying the power distribution equipment from which respective electric meters, associated with neighboring communication nodes, receive electric power. A communication node of a particular electric meter can select a suitable communication node of a neighboring electric meter with which it can communicate. When the particular electric meter experiences a loss in power, it can then transmit an immediate regarding the loss in power to the selected communication node.

4 Claims, 5 Drawing Sheets

(58) Field of Classification Search
CPC ........ H04L 45/22; H04L 45/28; H04W 40/22; G08B 25/06; H02J 13/0062; H02J 13/0075; H02J 13/0082; H02J 13/0089; H02J 13/0024; H04B 3/58; G06F 11/20
USPC ...... 340/660, 870.11, 870.16, 500–502, 509, 340/511, 545.4, 3.1, 3.43, 5.1
See application file for complete search history.

(56) References Cited

U.S. PATENT DOCUMENTS

| | | |
|---|---|---|
| 2004/0047406 A1 | 3/2004 | Hunt |
| 2005/0043059 A1 | 2/2005 | Petite et al. |
| 2006/0044117 A1* | 3/2006 | Farkas ................. H05K 7/1498 713/340 |
| 2006/0055549 A1 | 3/2006 | Fischer et al. |
| 2007/0140163 A1* | 6/2007 | Meier .................... H04W 8/005 370/329 |
| 2007/0183318 A1* | 8/2007 | Johnson .............. H02J 13/0075 370/225 |
| 2008/0183339 A1 | 7/2008 | Vaswani et al. |
| 2009/0219941 A1* | 9/2009 | Cardozo ................. H04L 12/42 370/406 |
| 2011/0051662 A1 | 3/2011 | Billhartz et al. |
| 2011/0051823 A1 | 3/2011 | Imes et al. |
| 2011/0083046 A1* | 4/2011 | Andrade ............. G06F 11/0793 714/47.1 |
| 2011/0270550 A1 | 11/2011 | Kreiss et al. |
| 2012/0146799 A1 | 6/2012 | Bell et al. |
| 2012/0179941 A1* | 7/2012 | Veillette ................. G01D 4/004 714/57 |
| 2012/0324273 A1* | 12/2012 | Shaffer ................... H04L 45/02 714/4.12 |

FOREIGN PATENT DOCUMENTS

| | | |
|---|---|---|
| WO | 2006/102172 A2 | 9/2006 |
| WO | 2011/109381 A2 | 9/2011 |

OTHER PUBLICATIONS

Office Action from U.S. Patent Office dated Aug. 2, 2013, issued in U.S. Appl. No. 15/954,136 (22 pages).
Office Action from U.S. Patent Office dated Jan. 22, 2013, issued in U.S. Appl. No. 12/954,136 (26 pages).
Supplementary European Search Report dated Sep. 24, 2015 issued in corresponding European Patent Application No. 13839368.1 (5 pages).

* cited by examiner

POWER OUTAGE NOTIFICATION AND DETERMINATION

FIELD OF THE INVENTION

The present system and method relate to the prompt identification of power outage areas by the selection of a suitable node to communicate outage notifications to a selected central system.

BACKGROUND OF THE INVENTION

In an Advanced Metering Infrastructure (AMI) network, a communication network can be employed to transmit messages between a back office system of a utility and meters that are deployed at customers' premises (e.g., homes, places of business, etc.). Examples of suitable communication networks include wireless mesh networks, cellular radio networks and power line carrier (PLC) networks.

In some known power distribution networks, an electric utility owns or contracts with power generation facilities, which produce the electric power that is initially carried to its customers over high voltage transmission lines. At substations, the voltage is stepped down and sent along distribution lines to transformers, which can be mounted, for example, on poles or in ground-level receptacles. From the transformers, the electric power travels along feeder lines to individual customers' premises, to be supplied to loads. At the premises, the amount of electric power that is consumed by the customer is measured with an electric meter.

The utility's AMI network may comprise communication nodes that are respectively associated with the electric meters. A communication node can be, for example, a Network Interface Card (NIC) that is incorporated within the structure of the electric meter itself. In one embodiment, the communication nodes can employ radio frequency (RF) signals to communicate with one another, and form a wireless mesh network. The communication nodes of the AMI network also communicate with one or more access points that provide for ingress and egress of the information to and from the mesh network. The access points communicate with the back office system of the utility, for example by means of a wide area network. In situations where the electric meters are sufficiently spaced that their respective communication nodes may not be able to directly communicate with one another, or with an access point, additional communication nodes that function as relays can be interspersed within the area of the wireless mesh network.

In other embodiments, different transmission media and/or network architectures may be employed to implement the AMI network.

In the above-described implementations, the communication network may be configured to communicate the topology of the utility distribution network, and thereby enable distribution equipment (e.g., substations, transformers, feeder lines, etc.) to be mapped to the downstream nodes that they service. For example, a communication node (e.g., a NIC) can be co-located with each item of distribution equipment (e.g., substation, transformer, etc.) to be mapped and monitored. A signaling technique can then be employed, for example by using one-way signaling over the power lines themselves, to associate each item of distribution equipment with the downstream nodes that it services. More detailed information regarding such mapping can be found in U.S. patent application Ser. No. 12/954,136, filed Nov. 24, 2010, the disclosure of which is incorporated herein by reference.

Another technique for mapping the topology of a communication network to that of a power distribution network may be to sample the voltage received at each customers' premises, and determine distribution equipment corresponding to information derived from the sampled voltage. For instance, the phase of the sampled voltage might be used to associate it with a particular substation or feeder line, as disclosed in U.S. Pat. No. 8,207,726, the disclosure of which is incorporated herein by reference.

While the topology of known communication networks may correspond to the topology of a utility's distribution network for delivering a resource, such as electricity, water or gas, to its customers, the back office system of the network may not become aware of a power outage (e.g., location, details, etc.) in a timely manner. For example, just prior to losing power, a communication node may be configured to transmit an outage notification (e.g., "last gasp") upstream to a predetermined node. If the predetermined node is not also experiencing a loss in power, the predetermined node can forward the last gasp message upstream via other nodes until the message reaches the back office system. The utility system can, therefore, promptly identify and direct attention to the power outage area.

While this identification process can be effective when upstream nodes, to which last gasp messages are transmitted, are not also experiencing a loss in power, it is limited in various aspects. For example, if a transformer experiences a loss in power, each customer premises, to which it provides electricity, will also experience a loss in power. In other words, all distribution equipment (e.g., electric meters) downstream of the affected transformer will experience a power outage. Thus, if a predetermined communication node, at which a last gasp message is to be received, is also experiencing a loss in power (e.g., since it receives power from the same affected transformer), the last gasp message will not be forwarded upstream. In such a case, the back office system would not be promptly notified of the power outage and, therefore, the power outage area would not be promptly identified and/or addressed.

Thus, a need exists for an improved system and method for electrical gridpoint mapping and targeting of power outages that overcomes such issues with respect to the transmission of last gasp notifications.

SUMMARY OF THE INVENTION

Some exemplary embodiments of the present disclosure involve a system for locating a power outage. One embodiment includes a plurality of electric meters and a plurality of communication nodes. Each of the electric meters is connected to a power distribution network and is configured to receive electric power from power distribution equipment in the power distribution network, and to receive information that identifies the power distribution equipment from which it receives electric power. Each of the communication nodes communicates via a communication network and is associated with an electric meter. Each node is configured to receive, (i) information identifying each neighboring communication node and (ii) the information identifying the power distribution equipment from which the neighboring communication node receives power. A first communication node of a first electric meter is configured to (i) select, based on the received information, a suitable second communication node of a neighboring second electric meter with which it can communicate and, when the first communication node experiences a loss in power, (ii) transmit an immediate notification of the outage to the selected second communication node.

Other exemplary embodiments of the present disclosure involve a method for targeting a power outage in a power distribution system. In such a method, the system receives, at a first communication node of a first electric meter, (i) information identifying each of a plurality of second, neighboring communication nodes and (ii) information identifying power distribution equipment from which each of the respective second communication nodes receives power. Once the identifying information is received, the first communication node selects a suitable second communication node with which it can communicate, based on the received information. The first communication node then transmits, upon experiencing a loss in power, a power outage notification to the selected second communication node.

BRIEF DESCRIPTION OF THE DRAWING FIGURES

The exemplary embodiments of the disclosed systems and methods can be better understood with reference to exemplary embodiments disclosed in the following drawings and description. The components in the figures are not necessarily to scale, emphasis instead being placed upon illustrating the principles of exemplary embodiments of the disclosed system. Moreover, in the figures, like elements are described with like reference numbers.

Further areas of applicability of the present disclosure will become apparent from the detailed description provided hereinafter. It should be understood that the detailed description and exemplary embodiments are intended for purposes of illustration only and that the claimed invention is not limited to these particular embodiments but rather fully encompasses variations and modifications which may occur to those skilled in the art.

DETAILED DESCRIPTION OF THE INVENTION

The invention described herein provides systems and methods for promptly and accurately targeting power outage areas utilizing a correspondence mapping between a utility distribution network topology and a data communication network topology. For purposes of explanation, embodiments of a power outage notification and determination system are described hereinafter with reference to an RF mesh network as an exemplary implementation of a communication network. It will be appreciated that other types of communication networks, e.g. PLC networks and cellular radio networks, can be employed to implement features of the system.

Figure 1:
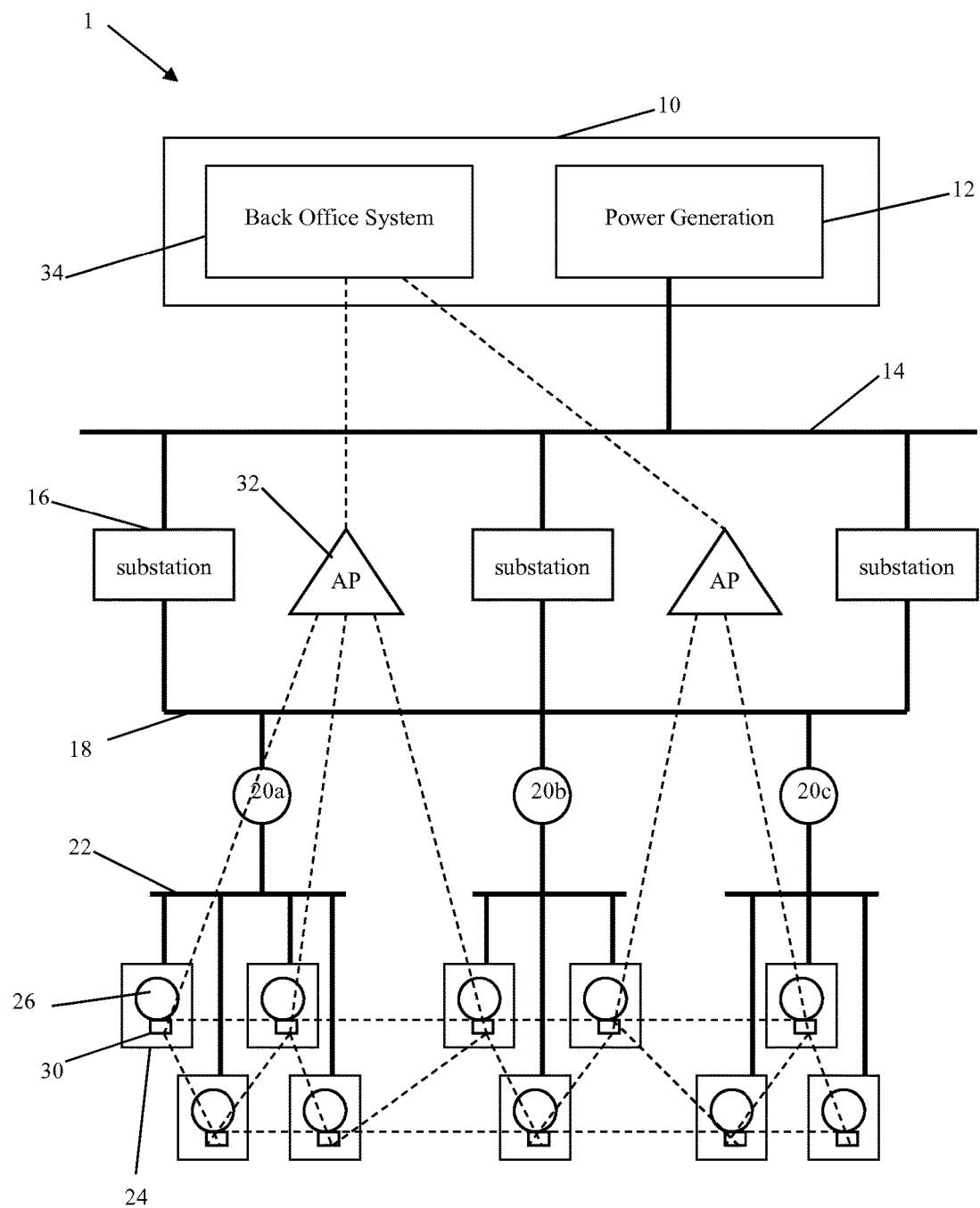
FIG. 1 is a diagram of a power distribution network and a corresponding data communication network according to an embodiment of the disclosure.

FIG. 1 is a diagram illustrating a power outage locating system 1, according to an embodiment of the disclosed system, which is comprised of a power distribution network and a corresponding data communication network. The power distribution network of the system 1 includes an electric utility 10, power distribution equipment (e.g., substations 16, transformers 20, feeder lines 22, electric meters 26, circuit breakers, etc.), and customers' premises 24.

The electric utility 10 owns, or contracts with, power generation facilities 12, which produce the electric power that is initially transmitted to its customers over high voltage transmission lines 14. Substations 16 receive the electric power, via the high voltage transmission lines 14, from power generation facilities, and step down the voltage and step up the current. Substations 16 are configured to then transmit the electric power via distribution lines 18 to transformers 20 (which can be mounted on utility poles or in ground-level receptacles) whereat the voltage is further stepped down and the current is further stepped up (e.g., so that the transmitted electrical power is practical for customer use). The transformers 20 are configured to then transmit the electrical power along feeder lines 22 to individual customers' premises 24 (e.g., homes, places of business, etc.), whereat electric meters 26 of the customers' premises 24 measure the received electric power.

The electric meters 26, each including a respective communication node (discussed in more detail hereinafter) include appropriate circuitry to detect, measure, and record an associated premise's consumption of the provided electric power and to further generate data with respect to the measured consumption of electric power. The communication nodes of the meters 26 are configured to receive information that identifies the power distribution equipment from which electric power is received. In other words, in addition to receiving electric power, the electric meters also receive information that can be used to identify the substations, transformers, feeder lines, etc., from which the electric power is obtained. In some embodiments, the electric meters are configured to detect an identifier encoded in the electrical power delivered to the meter, which identifies equipment in the power distribution network (discussed in more detail hereinafter). More generally, any suitable mechanism can be employed to provide a communication node with information regarding the power distribution components that are associated with its neighboring communication nodes, as discussed hereinafter.

The electric utility's Advanced Metering Infrastructure (AMI) network includes a plurality communication nodes, (e.g., meter nodes 30 (30$a_1$, 30$a_2$, 30$b_1$), transformer nodes 19 (19$a$, 19$b$, 19$c$), substation nodes 17 (17$a$, 17$b$, 17$c$) etc.), access points (AP) 32, and a back office system (BOS) 34. Communication nodes are active electronic devices (e.g., NICs) that are connected to the network and are capable of transmitting, receiving and/or relaying information. Communication nodes can be associated with distribution equipment of the power utility network. In some embodiments, as illustrated, e.g., in FIG. 1, an electric meter can include a communication node (herein referred to as "meter node"). In other embodiments, as illustrated, e.g., in FIGS. 2 and 3, a transformer can include a communication node (herein referred to as "transformer node"). In yet other embodiments, also illustrated, e.g., in FIG. 2, a substation can include a communication node (herein referred to as "substation node").

Each of the communication nodes (electric meter nodes 30, substation nodes 17, transformer nodes 19) is configured to capture and disseminate its own data and to relay data of neighboring nodes. In other words, the plurality of communication nodes collaborate in order to propagate data within the AMI network. Communication nodes can include any device with a mesh networking radio associated therewith, or incorporated therein, such as meters, relays, EV-SE charging stations, or any other suitable device. In some embodiments, a communication node can be a wireless NIC. To propagate data and to form a wireless mesh network for data communication, the communication nodes employ RF signals to communicate with one another, and to communicate with one or more of the access points 32.

As illustrated in FIG. 1, at least some of the electric meters of a plurality of electric meters (e.g., electric meter 26) includes a meter node (e.g., meter node 30). Said another way, each of a plurality of communication nodes is associated with a respective electric meter. Meter node 30 is configured to receive, from neighboring communication nodes with which it can directly communicate, information identifying each respective neighboring communication node and information identifying the power distribution equipment from which the respective electric meter associated with each neighboring communication node receives power. Such information can also identify, for example, which neighboring nodes include a battery backup and which ones are access points, if any.

Figure 3:
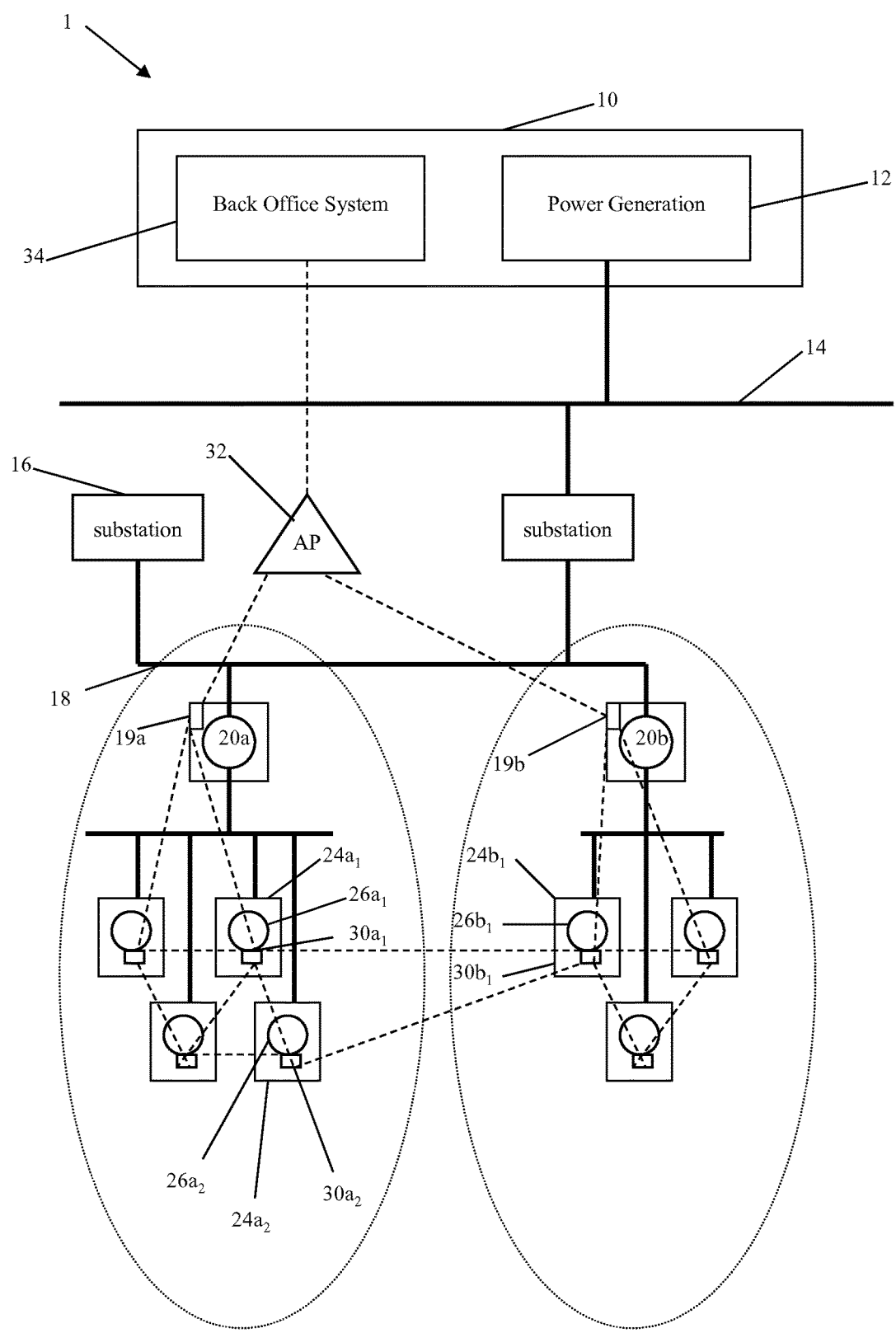
FIG. 3 illustrates a section of the power distribution network and corresponding data communication network of FIG. 1

A neighboring node is any other communication node that is located within the effective communication range of a particular communication node when the particular communication node is powered up and in an operational communication state. As illustrated in FIG. 3, for example, meter node $30a_1$ of electric meter $26a_1$ is configured to receive information from and transmit its own information to all neighboring communication nodes including, e.g., a neighboring downstream meter node $30a_2$ of electric meter $26a_2$ and neighboring meter node $30b_1$ of electric meter $26b_1$. Meter node $30a_1$ of electric meter $26a_1$ is also configured to receive information from an upstream transformer node 19a of transformer 20, from which electric meter $26a_1$ receives power. Because meter nodes (e.g., $30a_1$, $30a_2$, $30b_1$) each communicate identifying data, each meter node is made aware of its surrounding meter nodes and from which power distribution equipment they receive power. Referring to FIG. 3, for example, meter node $30a_1$ receives data from meter node $30b_1$ and is aware that electric meter $26b_1$, associated with meter node $30b_1$, receives its power from power distribution equipment different from the power distribution equipment from which electric meter $26a_1$ receives power. In particular, as illustrated in FIG. 3, electric meter $26b_1$ receives its power from transformer 20b while electric meters $26a_1$ and $26a_2$ receive power from transformer 20a.

Figure 2:
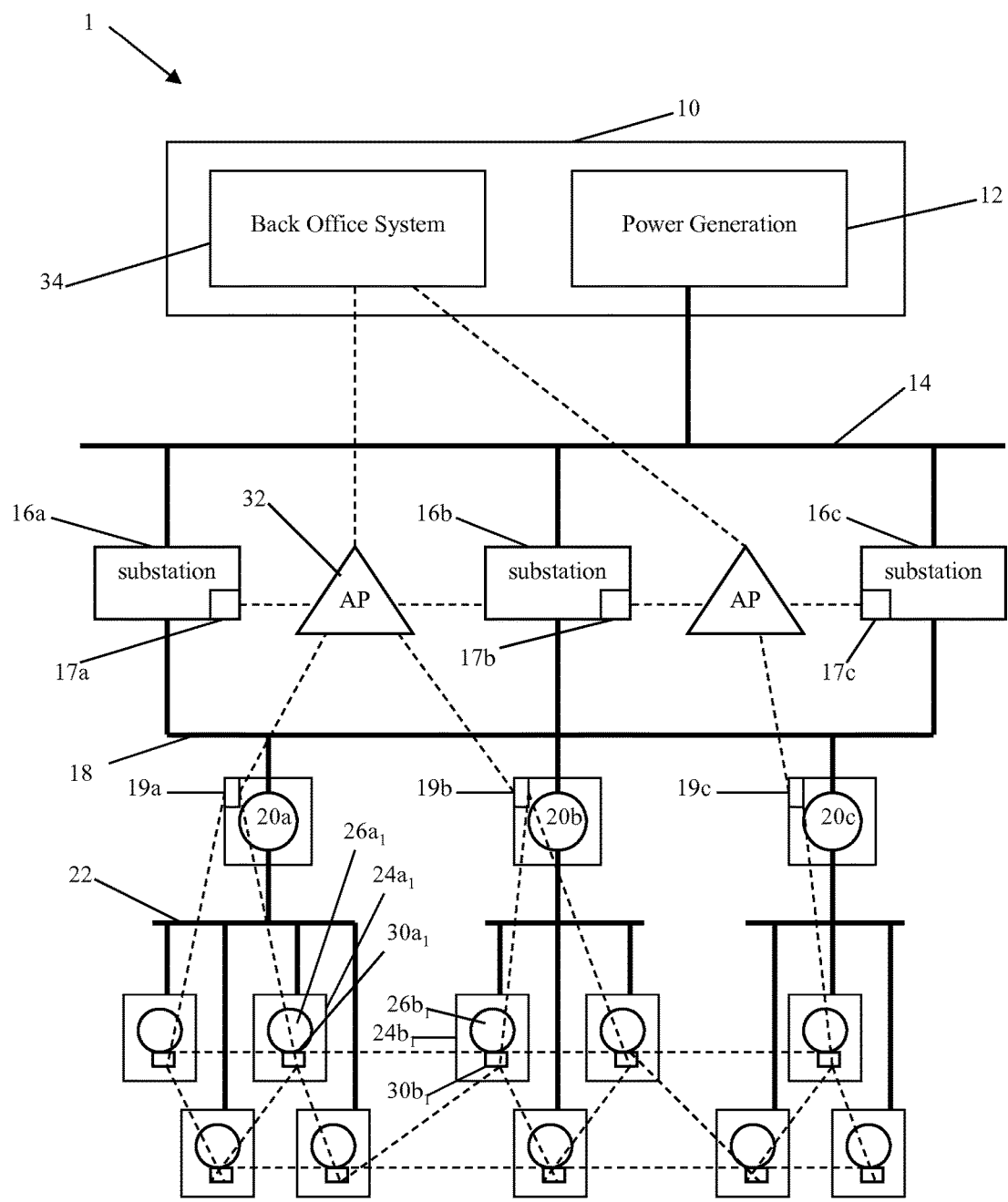
FIG. 2 is a diagram of the power distribution network and corresponding data communication network of FIG. 1 illustrating communication nodes of different power distribution equipment.

As provided above, communication nodes can also be respectively associated with transformers 20 and substations 16 within the power utility network to enable communication via the wireless mesh network directly from the locations of the respective transformers 20 and substations 16. As illustrated in FIG. 2, substations (e.g., 16a, 16b, 16c) continue to provide electric power through the power distribution network (via feeder lines 18) to transformers (20a, 20b, 20c), which then provide the power to the individual customer premises 24. However, the communication nodes 19 (19a, 19b, 19c) and 17 (17a, 17b, 17c), respectively associated with the transformer 20 and substation 16, enable data communication with the communication node 30 of electric meter 26 via the wireless network. For example, transformer node 19a associated with transformer 20a can communicate data to and receive data from meter node $30a_1$ of electric meter $26a_1$ and can further communicate its own data to substation node 17a associated with substation 16a (via access point 32) or relay the data received from meter node $30a_1$ of electric meter $26a_1$. Access point 32, therefore, is configured to recognize and communicate with a transformer device via the transformer node 19a that is associated and co-located with the transformer 20a and with the substation device 16a via the substation node 17a that is associated and co-located with the substation 16a.

While FIGS. 2 and 3 illustrate that data is relayed via access point 32 between transformers 20 (20a, 20b) and substations 16 (16a, 16b), in some embodiments, the communication node 17 of substation 16 may receive and transmit data directly to and from the communication node 19 of transformer 20.

Access points 32 provide for ingress and egress of the information to and from the mesh network. More specifically, access points 32 are configured to receive and to transmit data to and from other communication nodes and to further communicate data to and from the back office system (BOS) 34 of the utility, for example, by way of a wide area network (WAN).

The back office system (BOS) 34 of the electric utility 10 is configured to receive and transmit data via the mesh network to and from, for example, access points (AP) 32, to map a correspondence between the power distribution network topology (e.g., distribution equipment, power lines) and the mesh communication network topology (e.g., communication nodes, access points, etc.), and to target power outages within the power distribution network based on the mapping and the transmission of data between communication nodes.

With the above-described configuration, both the network communication nodes and the power distribution equipment have a relational topology that may be correlated during a discovery process to provide a mapping of the power distribution equipment through the data communication capability of the network communication nodes. In particular, when each communication node is first powered up, it engages in a discovery process (as described in more detail herein) in which it discovers and identifies neighboring nodes (e.g., substation nodes, other communication nodes, wireless relay points, and transformer nodes, etc.) with which it can communicate. Each of the meter nodes 30 (e.g., $30a_1$, $30a_2$, etc.), substation nodes 17 (17a, 17b, 17c.), access points, and transformer nodes 20 (20a, 20b, 20c, etc.), illustrated, e.g., in FIGS. 2 and 3, establishes communications with its neighboring nodes to establish a mesh network. Meter node $30a_1$, for example, may listen for an indicator in a powerline carrier that might constitute a "fingerprint" associated with an item of distribution equipment. This fingerprint might comprise, for example, a unique bit sequence that indicates it is a message from distribution equipment, such as a transformer. More specifically, a transformer node (e.g., transformer node 20a of FIG. 2) may be configured to introduce a phase shift (e.g., changing the voltage zero crossing in time) in the electric power being delivered to the premises $24a_1$. The meter node $30a_1$ detects and decodes these temporal shifts in the zero crossing to derive the unique sequence. From this information, the meter node $30a_1$ is able to identify a specific transformer that is supplying the power to its premises.

When an indicator is detected on the powerline carrier, the meter node $30a_1$ broadcasts an acknowledgement message via the wireless network, to establish communication with the transformer node $20a$. Upon receipt of this acknowledgement, the transformer node $20a$ sends a unique identifier, for example, its MAC address, along with a time that a unique signaling sequence will be sent downstream from the transformer, over the power line. At the indicated time, meter node $30a_1$ listens for and decodes a unique sequence sent over the power line to derive the identification of the transformer that transmitted the unique sequence. The unique sequence sent by the transformer node $20a$ over the wireless network is compared with the sequence received over the power line. If they match, the meter node $30a_1$ may send an acknowledgement to the transformer $20a$, which registers the meter node $30a_1$ as being associated with that transformer $20a$. Alternatively, or in addition, the meter node $30a_1$ may transmit the transformer identifier, in combination with the meter node identifier, to the back office system 34 of the electric utility 10.

In a typical network discovery process, a meter node (e.g., meter node $30a_1$) may not know how to communicate directly with a transformer node (e.g., transformer node $20a$) or other intermediate distribution point. Typically, the meter node $30a_1$ knows how to send messages to one or more access points 32, as a result of the discovery process and registration with such access point(s). In addition, the meter node $30a_1$ is able to communicate with the back office system 34, for example by having the network address of the BOS programmed into its firmware. As a result, various implementations can be employed to enable the meter nodes to communicate with a transformer node, or other such intermediate distribution point node.

In some embodiments, a meter node can communicate with the transformer node through the back office system (BOS), since the BOS knows how to reach a particular transformer node through an access point. When a utility node receives a unique identifier (such as a MAC address) from a transformer node along with a unique signaling sequence, it can send this information to the BOS via an AP to get the address information of that particular transformer node. The BOS can send an address lookup query message to a DNS server to get the IP address of the transformer node, based on the information received from the utility node. If the transformer node has multiple IP addresses, the BOS can obtain the address having the highest preference indicator in a DDNS route registry. Once the BOS has received this address information from the DNS server, it can forward that information to the meter node. The meter node can use that transformer node IP address information to send any packets to the transformer node via the BOS. Similarly, the transformer node can communicate with its connected meter nodes via the BOS.

In other embodiments, based on the information provided by the meter node to the AP, the AP can send route information back to the meter node to communicate with the transformer node. For example, transformer node $20a$ and the connected meter node $30a_1$ can be configured to route egress and ingress messages, to and from the BOS 34, via the same access point 32. Thus, when the meter node $30a_1$ receives a unique identifier from transformer node $20a$, it can send this information to the access point 32, since it is already configured to route messages to that access point 32. The access point 32 can analyze the received information from the meter node $30a_1$ (such as the MAC address of transformer node $20a$) and process it to determine if the MAC address provided in the received information is one of its associated nodes (i.e., a node using the same AP for egress and ingress). If the transformer node $20a$ is also using the same AP, the access point 32 can provide the address information back to the meter node $30a_1$ (which may include the route information to reach the transformer node). Once it has received the information from an AP about the transformer node $20a$, the meter node $30a_1$ can use the route information received from the AP to communicate with the transformer node $20a$ (via the AP or even via the BOS 34).

If the transformer node does not utilize the same AP as the meter node, then the AP can forward the received information from a utility node to the BOS as mentioned in the previous embodiment.

In yet other embodiments, based on the unique sequence (which may be, for example, the MAC address of the transformer node, as discussed above), the meter node can ask its direct neighbors if they have the information on how to reach that particular transformer node. Before sending any messages to the AP, a meter node can broadcast MAC address information, of the transformer node, to its neighbor nodes to get route information to reach the transformer node. If the neighbor node has route information to reach a particular transformer node, based upon the MAC address or other information provided by the requesting meter node, the meter node can use a route through that neighbor to communicate with the transformer node.

As an alternative to the foregoing example, other techniques can be employed by the communication nodes to determine components of the power distribution network that they are associated with. For instance, the voltage received at a customer's premises can be sampled to identify certain characteristics that might be associated with certain items of distribution equipment. As an example, different transformers, and hence feeder lines, in a community might transmit different phases of the power, and by determining the phase of the received power it may be possible to isolate the particular substation, transformer and/or power line to which a given premises is connected. Likewise, items of equipment might introduce perturbations in the voltage, e.g. frequency or amplitude, which can serve as a unique fingerprint for that equipment. By detecting and reporting these attributes of the received power to the back office system, an association can be made between the communication node at a given premises and the equipment that participates in the distribution of power to that premises.

The topology map created from the identifications sent by the meter nodes, or otherwise obtained by the back office system, can be employed to monitor and manage the operation of the distribution network, via the wireless AMI network. In addition, the created map enables the meter nodes, in the event of a power outage (e.g., loss in power at particular customers' premises), to select a suitable neighboring meter node to transmit a last gasp notification (e.g., power outage notification) so that the message can be relayed to the back office system (BOS) 34 for accurate and prompt identification of the power outage area.

As previously described herein, each of the meter nodes 30 (e.g., $30a_1$, $30a_2$, etc.) is configured to capture and disseminate its own data, and to receive and relay data of neighboring nodes. As illustrated, for example, in FIG. 3, upon powering up, meter nodes $30a_1$, $30a_2$, $30b_1$ receive identifying information broadcast from neighboring nodes. Thus, they become aware of, for example, the power distribution equipment from which their neighboring nodes receive power. For example, meter node $30a_2$ is made aware that neighboring meter node $30a_1$ (associated with meter $26a_1$) is an upstream meter node and receives power from the same transformer (20a) from which it receives power. Meter node $30a_2$ is also made aware that neighboring meter node, for example, meter node $30b_1$ (associated with electric meter $26b_1$) receives power from power distribution equipment different than the power distribution equipment from which it receives power. For example, meter node $30b_1$ receives power from transformer 20b while meter node $30a_2$ receives power from transformer 20a.

As an alternative to obtaining the distribution equipment information from its neighboring nodes, a communication node may obtain the information in different ways. For example, the back office system may have the ability to determine the association of a given node with specific distribution equipment via other resources located at the back office, such as customer information, account records, etc. From this information, the back office system can assemble topology information that it disseminates to the communication nodes.

At each node, a list is maintained of the node's neighbors, e.g. a node queue, which is periodically updated. For each neighbor in the list, relevant information about that neighbor can be included. Such information can include the distribution equipment with which that neighbor is associated, the type of node (e.g. meter node, relay, access point, etc.), and whether it has a battery backup.

With this stored information, each of the meter nodes can determine which of its neighboring nodes would be suitable to immediately communicate with in the event it experiences a loss in power. More specifically, each meter node can analyze the identifying data received from its neighboring meter nodes, and select, based on the received information, a suitable neighboring meter node with which it can communicate, upon experiencing a loss in power, to transmit an immediate notification of its power outage. In some embodiments, a plurality of suitable neighboring meter nodes can be further prioritized in a preferred order in which a final selection can be made with respect to which meter node the power outage notification (e.g., last gasp) should be transmitted.

In FIG. 3, for example, based on the received identifying information from neighboring meter nodes, meter node $30a_2$ can determine which of its plurality of neighboring meter nodes is best suited to receive a last gasp (e.g., power outage notification), in the event it experiences a power outage. In a normal operating status (when not experiencing a power failure), a meter node $30a_2$ would, in most cases, communicate specific data to the BOS 34 via an upstream neighboring node, for example $30a_1$, because it may have the lowest cost path for reaching the AP 32.

However, in the event of a power failure, the back office system (BOS) can only identify a location of a power outage if it receives notifications identifying the meters whereat the power outage has occurred. Thus, if meter node $30a_2$ has experienced a loss in power, a last gasp notification (e.g., power outage notification) from meter node $30a_2$ to $30a_1$ may not be effective since meter node $30a_1$ receives power from the same power distribution equipment (transformer 20a) as meter node $30a_2$. Therefore, meter node $30a_1$ may also be experiencing a loss in power and would not be capable of relaying the received last gasp message upstream. Thus, meter node $30a_2$ is configured to select and/or prioritize suitable neighboring meter nodes to which a last gasp message should be transmitted in the event of a power outage. For example, meter node $30a_2$, as discussed above, is aware that neighboring meter node $30b_1$ receives power from distribution equipment (transformer 20b) different from that which meter node $30a_2$ itself receives power. Thus, in the event that meter node $30a_2$ experiences a loss in power, a possibility exists that meter node $30b_1$ may not be experiencing a loss in power since it receives power from a different transformer 20b. Accordingly, a last gasp message from meter node $30a_2$ may be received at meter node $30b_1$ and relayed to other communication nodes upstream (e.g., transformer 20b, access point 32, etc.) until it reaches the back office system 34, whereat the location of the power outage can be identified. Thus, a selection of a suitable neighboring meter node can be made, for example, on a basis of the distribution equipment from which a neighboring meter receives power (e.g., if a neighboring meter receives power from a different transformer).

In some embodiments, a node can prioritize its neighboring nodes from which a suitable meter node can be selected to send last gasp messages. Such prioritizing can be based, for example, on the distribution equipment from which the neighboring meters receive power. Alternatively, or additionally, prioritizing can be based on whether the neighbor node has a battery backup, the type of node, and/or the quality of the network path to that node. This prioritization information for the neighboring nodes can be stored in the node queue.

Figure 4:
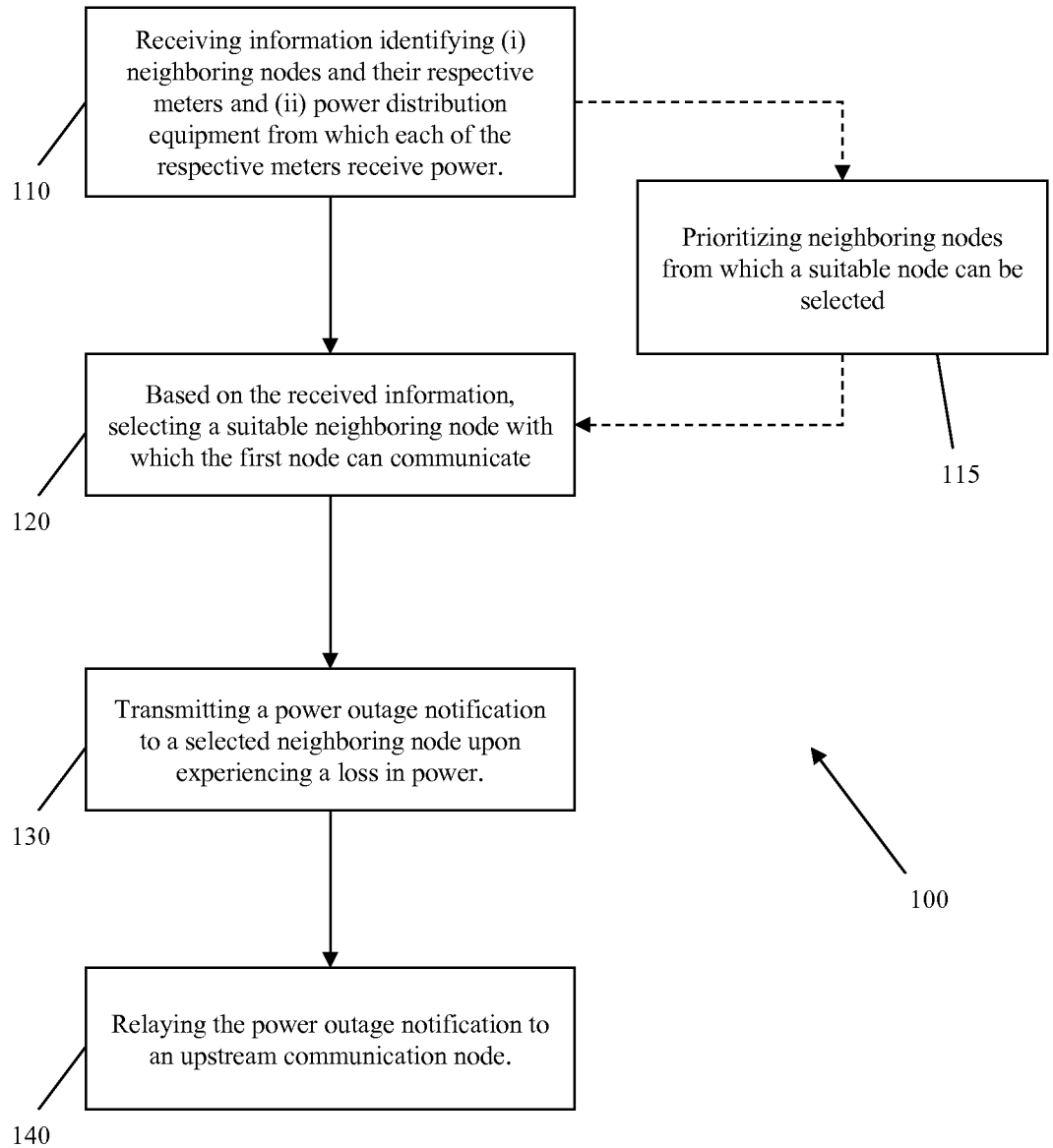
FIG. 4 is a flow chart illustrating a method for identifying the location of a power outage via the power distribution network and corresponding data communication network of FIG. 1 according to an embodiment.
Figure 5:
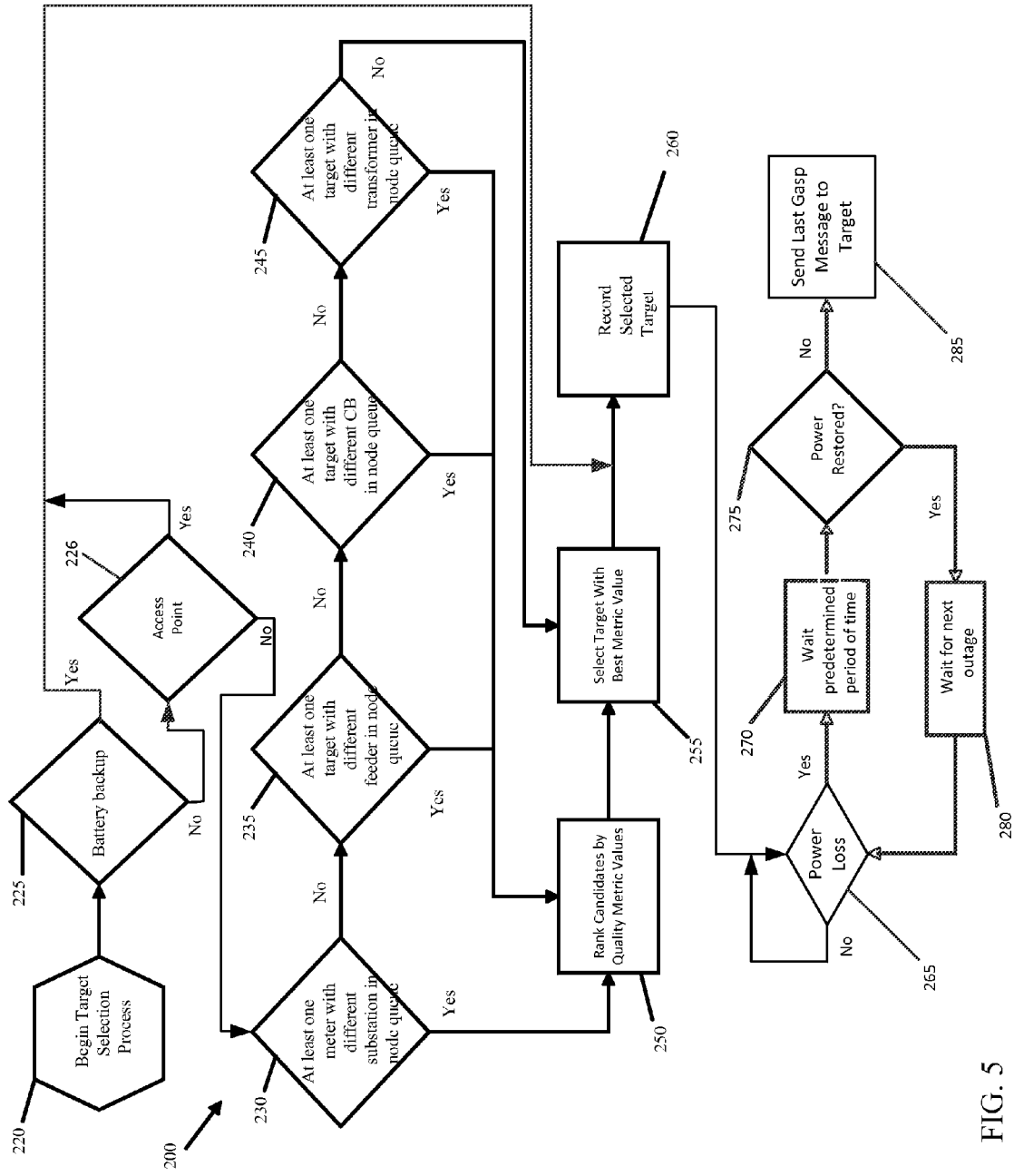
FIG. 5 is a process diagram of a process for selecting a suitable communication node via the power distribution network and corresponding data communication network of FIG. 1 according to an embodiment.

FIGS. 4 and 5 illustrate flow chart and process diagram, respectively, demonstrating, a process for identifying a power outage via the power distribution network and corresponding RF mesh data communication network of FIG. 1, and selection of a suitable communication node to which a power outage notification is to be transmitted.

In method 100, as illustrated in FIG. 4, at step 110 a first communication node (e.g. meter node) receives information from neighboring communication nodes identifying (i) each of the neighboring nodes and (ii) the power distribution equipment from which each of the respective meters receives power. Based on the received information, at step 120, the first communication node selects a suitable second communication node with which it can communicate. In some embodiments, prior to selecting a suitable second communication node, at step 115 the first communication node prioritizes, based on the received information, the neighboring nodes from which a suitable node can be selected. Once a second communication node has been selected, and upon experiencing a loss in power, the first communication node, at step 130, transmits an immediate power outage notification (last gasp notification) to the selected communication node. At step 140, the selected second communication node relays the received power outage notification to a third communication node that is upstream of the second communication node. The relay of information is then continued until the back office system receives the power outage notification and identifies an area in which a power outage is occurring.

The process diagram of FIG. 5 illustrates a selection process 200 of a suitable neighbor node in the event that a first communication node experiences a loss in power. Prior to beginning this process, each of the meter nodes has already received identifying information with respect to its neighboring nodes. As depicted in FIG. 5, the selection of a suitable neighboring meter node begins at step 220. At step 225, the first meter node determines, based on the previously received identifying information of its neighboring meter nodes, if any of the neighboring nodes in its node queue includes a battery backup. If, at step 225, it is determined that a neighboring node includes a battery backup, the first meter node selects the node with the battery backup and records it as the selected node for last-gasp outage messages in step 260. If, however, if it determined that none of the neighboring meter nodes includes a battery backup, the first meter node determines if any of its neighbors is an access point, at step 226. If so, the first meter node selects the access point and records it as the selected node for last-gasp outage messages in step 260. If no access point is identified at step 226, the first meter node looks for neighboring nodes that receive power from distribution equipment different from that which the first meter receives power.

At step 230, the first meter node determines, based on in its node queue (i.e., received identifying information), if at least one neighboring electric meter receives power from a substation different from the substation from which the first electric meter receives power. If yes, the first meter node (associated with the first electric meter) ranks the neighboring meters having a different substation by a suitable quality metric at step 250 and proceeds to select, at step 255, a suitable target meter node based on the best metric value. Once the selection is made, the first meter node records it as the selected node for last-gasp outage messages in step 260. Examples of suitable metrics that can be used to determine the quality of the transmission path include packet success rate, received signal strength indicator (RSSI), latency, and/or other path cost factors.

It is noted that the quality metric value can be determined in various ways or combinations thereof. For example, in some embodiments, the metric value can be determined during every interaction between meter nodes. In other embodiments, it can be determined by polling all devices (e.g., electric meters, access points, relays, etc.) in a range of the polling electric meter and storing the quality of the signal. In such an embodiment, the devices can be polled at predetermined time intervals (e.g., every 300 seconds). Any other suitable method for obtaining a quality metric value can also be utilized as it applies to the present disclosure.

If, at step 230, the first node determines that the neighboring meter nodes each receive power from the same substation (i.e., determines that none of the neighboring nodes have different substations), the process proceeds to step 235 whereat the first communication node determines if at least one of the neighboring nodes receives power from a feeder line different from the feeder line from which the first node receives power. If yes, the process proceeds to step 250, as described above, whereat the first node ranks the neighboring nodes having different feeder lines by quality metric values and then selects, at step 255, a suitable target node based on the best metric value. Once the selection is made, the first meter node records it as the selected node for last-gasp outage messages in step 260.

If however, at step 235, the first determines that the neighboring meter nodes each receive power from the same feeder line (i.e., determines that none of the neighboring nodes have different feeder lines), the process proceeds to step 240 whereat the first communication node determines if at least one of the neighboring nodes receives power via a line having a different circuit breaker from the circuit breaker through which the first electric meter receives power. If yes, the process proceeds to step 250, as described above, whereat the first node ranks the neighboring nodes by quality metric and then selects, at step 255, a suitable target node based on the best metric value. Once the selection is made, the first meter node records it as the selected node for last-gasp outage messages in step 260.

If however, at step 240, the first node determines that the neighboring meter nodes each receive power via the same circuit breaker, the process proceeds to step 245 whereat the first communication node determines if at least one of the neighboring nodes receives power from a transformer different from the transformer from which the first node receives power. If yes, the process proceeds to step 250, as described above, whereat the first meter node ranks the neighboring meters by quality metric and then selects, at step 255, a suitable target meter node based on the best metric value. Once the selection is made, the first node records it as the selected node for last-gasp outage messages in step 260.

If, at step 245, the first node determines that the neighboring meter nodes each receive power from the same transformer (i.e., determines that none of the neighboring nodes have different transformers), the process proceeds to step 255, whereat a suitable target node based on metric values. Once the selection is made, the first meter node records it as the selected node for last-gasp outage messages in step 260.

Thereafter, when the first node experiences a loss in power at step 265, the first node (e.g. NIC), waits a predetermined period of time (e.g., 100 milliseconds) at step 270. During this period of time, the node operates on stored power, e.g. from a battery or storage capacitor. If power to the node is restored within that predetermined amount of time, as determined at step 275, the process stops and waits for another outage at step 280. However, if it is determined at step 275 that power is not restored to the node with the predetermined amount of time, the node sends a last gasp message to the selected target node at step 285. The last gasp message includes an identification of the node, and can include other information such as the time at which the outage occurred, and/or the power distribution equipment associated with that node.

In accordance with the system and method disclosed herein, the mapping of correspondence between the utility (e.g., power) distribution network topology (e.g., distribution equipment, power lines) and the mesh communication network topology (e.g., communication nodes, access points, etc.) enables individual nodes to select, based on information received from neighboring nodes, a suitable node to which a notification is to be transmitted, in the event of a power outage. This selection process improves the likelihood that a last gasp power outage notification will be received at the BOS and that a power outage will be promptly identified.

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently or in a different order. For example, while a meter node is described herein as a downstream component detects a unique identifier and receives information on neighboring meter nodes, other downstream components that have the ability to detect the unique identifiers and communicate upstream can also be associated with an intermediate distribution point. As another example, while the selection of a suitable target communication node has been described primarily as occurring prior to a first meter experiencing a loss in power, the selection process can occur, in some embodiments, after the first meter experiences a loss in power. In such embodiments, both the selection of a suitable target meter node and the issuance of the last gasp message should be completed within a reasonably short period of time (e.g., 250 milliseconds of outage start).

The previous description of the various embodiments is provided to enable any person skilled in the art to make or use the invention recited in the accompanying claims of the disclosed system and method. While exemplary embodiments of the disclosed system have been particularly shown and described with reference to embodiments thereof, it will be understood by those skilled in the art that many variations, modifications and alternative configurations may be made to the invention without departing from the spirit and scope of exemplary embodiments of the disclosed system. The scope, however, of the method and system for targeting a power outage is limited only by the meets and bounds as articulated in the claims appended hereto.

What is claimed is:

1. A method for providing notification of an outage in a power distribution system, comprising:
   a) receiving, at a first node of a communication network in the power distribution system, (i) information identifying each of a plurality of second, neighboring nodes, and (ii) information identifying power distribution equipment from which each of the respective second nodes receives electric power;
   b) determining whether any of the second nodes has a battery backup;
   c) if at least one of the second nodes has a battery backup, recording one of the nodes having a battery backup as a designated node to which outage notification messages are to be transmitted;
   d) if none of the second nodes has a battery backup, determining whether any of the second nodes receives electric power from power distribution equipment other than the power distribution equipment from which the first communication node receives electric power, wherein step d) is performed iteratively for each of a plurality of different types of power distribution equipment until a second node is found that receives electric power from power distribution equipment other than power distribution equipment from which the first communication node receives electric power;
   e) if at least one of the second nodes receives electric power from power distribution equipment other than the power distribution equipment from which the first communication node receives electric power, ranking those second nodes that receive electric power from said other power distribution equipment according to a message transmission metric;
   f) recording the node having the highest rank as the designated node to which outage notification messages are to be transmitted;
   g) if none of the second nodes receives electric power from power distribution equipment other than the power distribution equipment from which the first communication node receives electric power, selecting one of the second nodes based on the message transmission metric,
   h) recording the selected node as the designated node to which outage notification messages are to be transmitted,
   i) detecting, at the first node, that a loss in power has occurred, and
   j) transmitting, from said first node, a power outage notification to the second node recorded as the designated node.

2. The method according to claim 1, further including, after step c) and prior to step d):
   determining whether any of the second nodes is an access point; and
   if at least one of the second nodes is an access point, recording one of the nodes that is an access point as a designated node to which outage notification messages are to be transmitted.

3. The method according to claim 1, wherein step d) is iteratively performed for the following types of power distribution equipment, in the order of:
   substation,
   feeder,
   circuit breaker,
   transformer.

4. A method for providing notification of an outage in a power distribution system, comprising:
   a) receiving, at a first node of a communication network in the power distribution system, (i) information identifying each of a plurality of second, neighboring nodes, and (ii) information identifying power distribution equipment from which each of the respective second nodes receives electric power;
   b) determining whether any of the second nodes has a battery backup;
   c) if at least one of the second nodes has a battery backup, recording one of the nodes having a battery backup as a designated node to which outage notification messages are to be transmitted;
   d) if none of the second nodes has a battery backup, determining whether any of the second nodes receives electric power from power distribution equipment other than the power distribution equipment from which the first communication node receives electric power, wherein step d) is performed for a plurality of different types of power distribution equipment to find a second node that receives electric power from power distribution equipment other than power distribution equipment from which the first communication node receives electric power;
   e) if at least one of the second nodes receives electric power from power distribution equipment other than the power distribution equipment from which the first communication node receives electric power, ranking those second nodes that receive electric power from said other power distribution equipment according to a message transmission metric;
   f) recording the node having the highest rank as the designated node to which outage notification messages are to be transmitted;
   g) if none of the second nodes receives electric power from power distribution equipment other than the power distribution equipment from which the first communication node receives electric power, selecting one of the second nodes based on the message transmission metric,
   h) recording the selected node as the designated node to which outage notification messages are to be transmitted,
   i) detecting, at the first node, that a loss in power has occurred, and
   j) transmitting, from said first node, a power outage notification to the second node recorded as the designated node.

* * * * *